Figure 3:
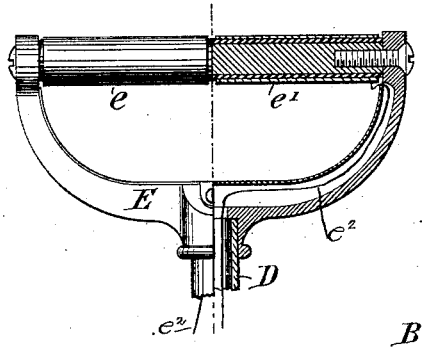

(No Model.)

E. R. WHITNEY.
ELECTRO THERAPEUTIC STRENGTH TESTING MACHINE.

No. 362,133. Patented May 3, 1887.

Witnesses:

Inventor
Edwin R. Whitney
Per Attys:

UNITED STATES PATENT OFFICE.

EDWIN R. WHITNEY, OF MANCHESTER, N. H., ASSIGNOR TO HORACE AND WILLIAM PADDOCK FAIRBANKS, OF ST. JOHNSBURY, VT.

ELECTRO-THERAPEUTIC STRENGTH-TESTING MACHINE.

SPECIFICATION forming part of Letters Patent No. 362,133, dated May 3, 1887.

Application filed July 30, 1886. Serial No. 209,573. (No model.) Patented in France October 22, 1886, No. 179,188, and in Belgium November 15, 1886, No. 74,962.

*To all whom it may concern:*

Be it known that I, EDWIN RUTHVEN WHITNEY, of the city of Manchester, in the county of Hillsborough and State of New Hampshire, have invented certain new and useful Improvements in Electrical Strength-Testing Machines; and I do hereby declare that the following is a full, clear, and exact description of the same.

My invention has reference to the machines used to indicate automatically the results of muscular exertion—such, for instance, as the number of pounds weight lifted by a pull, the weight of impact of a blow, &c.; and it consists in combining with such mechanism a source of electricity, by which a current is, when the machine is operated, sent to the operator, the strength of the current being proportioned to the force exerted by him, and automatically registered in like manner.

In the drawings hereto annexed, and forming part of this specification, I show a machine for testing the amount of weight lifted embodying my invention, in which—

Figure 4:
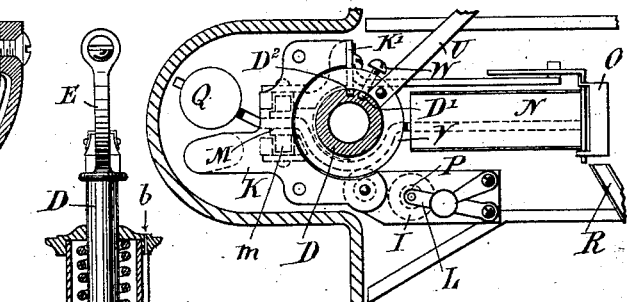
Figure 1:
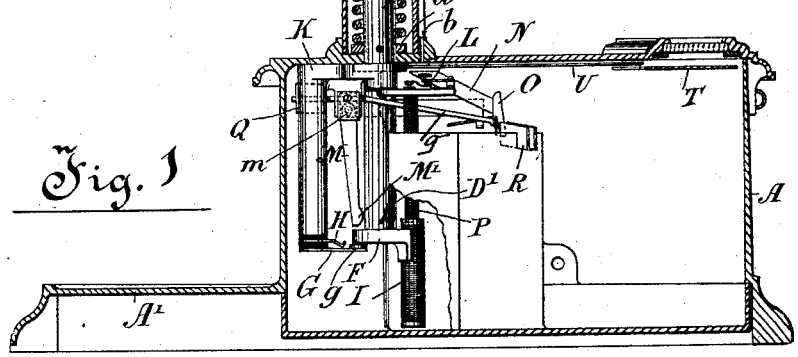
Figure 2:
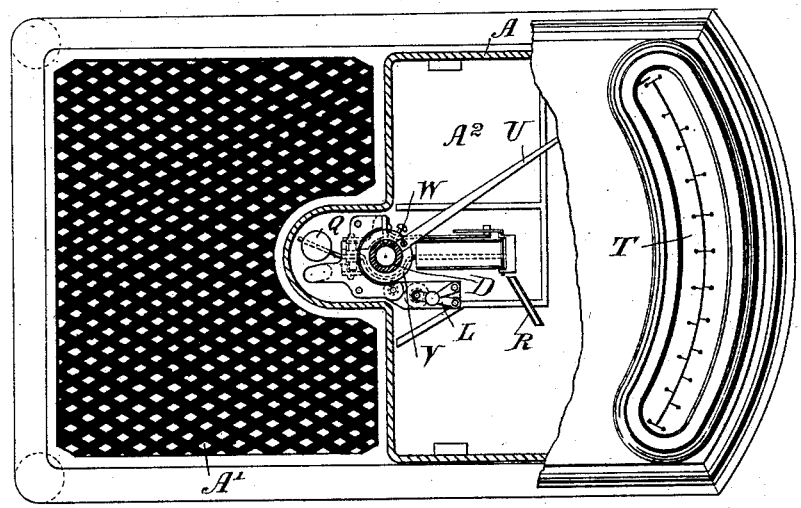

Figure 1 is a sectional elevation, partly broken away, of the apparatus; Fig. 2, a plan view similarly partly broken away; Fig. 3, a detail of handle, and Fig. 4 an enlarged view of part of devices shown in Fig. 2.

Similar letters of reference indicate like parts.

A is the main case, containing the apparatus proper, A' being the foot-plate. B is a vertical tube holding the spring S, surrounding the long tube D, said spring resting at its lower end on a collar, $d$, formed on tube D. Upon the top of D is mounted the handle E, in which are arranged two insulated metal ferrules, $e\ e'$, connected to the induction-coil I by wires, $e^2\ e^2$ passing down through the tube D. The lower end of the tube D has a collar or projection, F, connected with the induction-coil I, and resting upon an insulated block, $g$, on the spring G, which, with the spring H, is secured to a downward projection from the casting K, this spring H being, as shown, suitably insulated.

L is the vibrator, the battery and connections, which are placed in compartment $A^2$, not being shown.

The long tube D is normally locked down by the lever or catch M, pivoted at its upper end to the casting K, as shown at $m$, and having its point M' engaging with projection F, but may be free, as will now be described.

In the tube B is an opening, $b$, to receive any required coin, which, when introduced through it, falls through the trough N into the cradle O, its weight there being sufficient to overbalance the counterpoise Q, which is carried upon a rod or arm, $q$, fixed, by preference, to the upper end of catch-lever M, and having its inner extremity fastened to said cradle, so that by depressing it at this end the counterpoise or weight Q is raised and causes the lever M to swing on the edges of pivot $m$ sufficiently clear of the collar or projection F to admit of the handle E being lifted, its upward movement bringing F into contact with the curved face of M', throwing M still farther over, the cradle O being thereby tripped so as to allow the coin to run down the spout R into another compartment of the case.

The upward draft of the tube D releases the spring G and allows it to make contact with the spring H, thereby closing the primary circuit of the battery through these springs, the primary coil P, and the vibrator L, in a well-known way. When the lifting-tube is at its lowest point, the secondary coil I is nearly or quite clear of the primary coil P; but as the handle is raised the secondary coil is drawn more and more over it, until, at the utmost point of the lift of the tube D, it practically covers the primary coil and delivers its most powerful current to the two insulated metal ferrules $e\ e'$ by the connections above mentioned.

As a means of indicating the power applied to the handle and the amount of electric energy developed, an indicator face or scale, T, (shown clearly in Fig. 2,) divided up into units of pounds weight and electric units, may be set in the top of the casing A, as shown, and a needle or pointer, U, be worked as follows: A loose collar, V, on which is mounted the pointer U, encircles the tube D, and is prevented from moving in the direction of its draft by the casting K; but a set-screw, W, passing through the collar V and entering a spiral slot or groove, D', cut in the tube D, enables the collar V to revolve and the pointer U to move when the tube is drawn upon. A steel key or spline, K', is screwed to the casting K, and works in a vertical slot, D², cut in the tube D, so as to prevent the tube from being turned in any way whereby the pointer might be worked erroneously.

It will be readily understood that although I have in the accompanying drawings shown and described a machine by which the amount of weight lifted can be ascertained, the actual construction of the parts will not be altered in a machine for testing the force of impact of a blow, or even the power with which the breath can be exhaled, the pressure being in every case exerted against a spring and equivalent means being used to indicate the result.

The machine covered by this description is, however, not merely a machine for testing the strength of any set of muscles of the body, but also acts, and by the same operating mechanism, to throw a current of electricity through the body of the operator while his muscles are in the state of tension caused by the exercise of muscular force against the spring described; and I have found that a highly beneficial and therapeutic effect is produced thereby.

Having thus described my invention, I beg to state that what I claim is as follows:

1. In a therapeutic strength-testing machine, the combination of the following elements, namely: a resisting-pull, a battery, an induction-coil, one portion of which is movable with the pull, and connections from the secondary coil to the handle, by which a continuous pull in one direction will cause a constantly-increasing induced current to be sent through the operator's body, and the diminution of or cessation of such pull will respectively diminish or cut off such current, substantially as and for the purpose set forth.

2. In a therapeutic strength-testing machine, the combination of a resisting-pull, a secondary coil connected thereto, a primary coil over which the secondary coil is drawn to an extent determined by the strength of the pull, and electrical connections from secondary coil to the handle of the pull, as and for the purposes set forth.

3. The combination of a strength-testing machine, an induction-coil, an automatic coin-catching device, (arranged to unlock the apparatus so that it can be operated upon when the coin is introduced,) and an indicator showing pounds lifted and units of electric energy developed, substantially as set forth.

EDWIN R. WHITNEY.

Witnesses:
D. ARTHUR TAGGART,
N. H. WILSON.